Patented May 3, 1927.

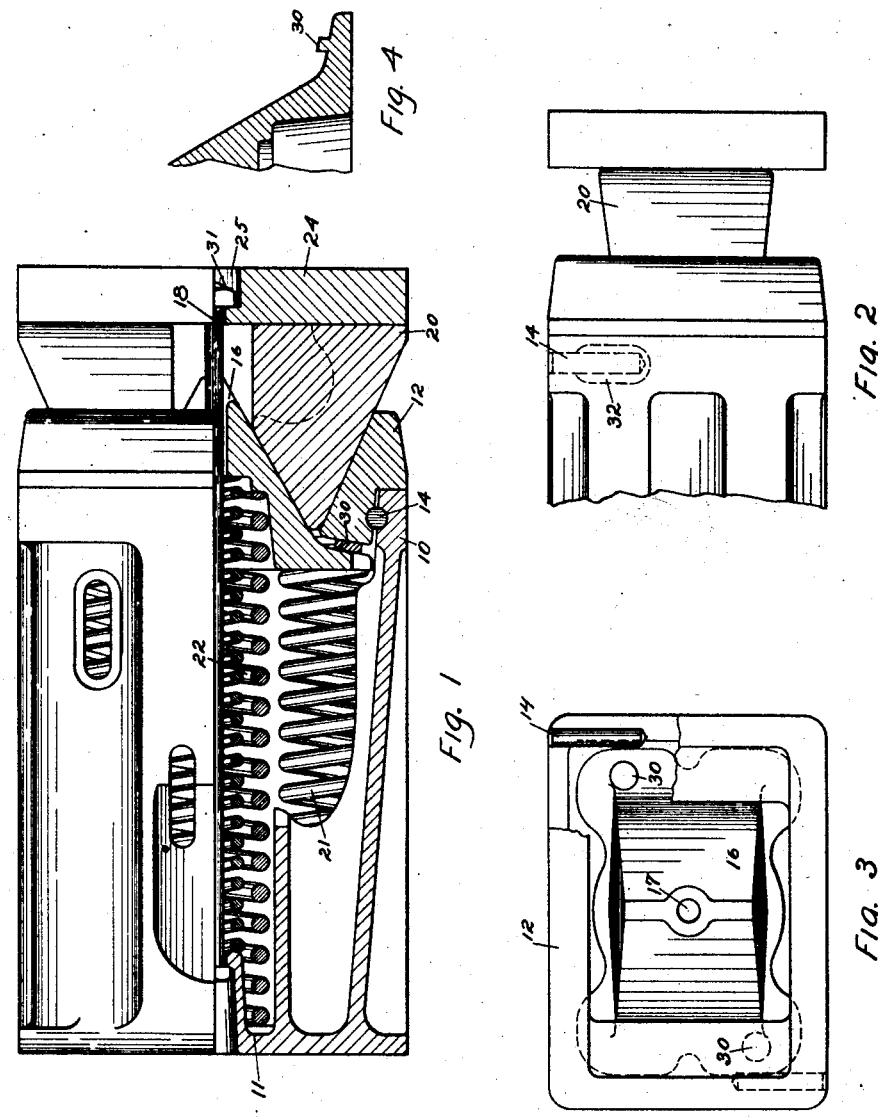

1,627,433

UNITED STATES PATENT OFFICE.

ERNEST G. GOODWIN, OF PELHAM, NEW YORK, ASSIGNOR TO STANDARD COUPLER COMPANY, OF NEW YORK, N. Y., A CORPORATION OF NEW JERSEY.

DRAFT GEAR AND METHOD OF INSTALLING SAME.

Application filed October 3, 1924. Serial No. 741,408.

This invention relates to draft gears, and has for its principal object the production of a substantial, self-contained, high-capacity draft gear including means for permitting the ready installation of the gear in a standard pocket without in any way detracting from the efficiency of the gear.

A further object of the invention is the provision of a gear of the type employing a barrel, friction box, which may be integral with the barrel, but preferably is not, and a plurality of wedges between the friction box and the usual follower, and including as a new element a chock inserted between the friction box and one of the wedges to place the springs under sufficient extra initial compression so that the gear will assemble somewhat shorter than the space into which it is to be applied, thereby avoiding the usual difficulties arising from a tight fit.

A still further object of the invention is the provision of a method of assembling a draft gear in order to secure extra compression of the springs to render more convenient the installation of the draft gear.

In the drawings:

Figure 1 is a longitudinal section through a railway draft rigging embodying the invention;

Figure 2 is a partial elevation of the gear at right angles to the section shown in Figure 1;

Figure 3 is an end elevation; and

Figure 4 shows the chock cast integral with one of the parts.

In the present application, no claim is made to the specific structure of the gear other than in combination with the chock and the method of assembling the gear and chock. The particular type of gear illustrated is shown merely as one example of the use of the invention, and while this gear is the preferred type for use, the invention is not to be limited to any form of gear except as restricted by the claims.

The barrel 10 is shown as having a closed bottom 11 integral therewith, and having a separate friction box 12, secured to the barrel by means of pins 14, which are driven in hot as later explained.

The wedges are shown in the drawings as three in number, namely, a central wedge 16 centrally perforated as at 17 to receive the retainer bolt 18 and two side friction blocks 20. The latter, which are preferably of gun iron, slidably engage the friction box and also the central wedge, which is held outwardly or away from the bottom 11 by means of springs herein shown as four double coil corner springs 21 and one double coil center spring 22. The follower 24 is recessed in the usual manner as at 25 to receive the nut 31 of the retainer bolt 18.

The chock 30, which is an important element of the combination herein claimed, may be of any desired material capable of withstanding the static pressure of the springs. There need be only two of these members 30, and while I prefer to have them of metal, they may be made of hard wood or other substance, requiring merely that they be of sufficient thickness to maintain the springs with enough extra initial compression to permit ready installation of the draft gear in the standard pocket. With a standard 9" x 12½" gear, a thickness of from five sixteenths to seven-sixteenths of an inch is considered the best practice.

From experience gained by the use of the device, I advise the employment of two of these chocks 30, which, as stated, are preferably small metal disks which need only be about one-half inch in diameter, placed at diagonal corners, preferably adjacent the pins 14, which permanently secure together the cast steel barrel and the heat-treated steel friction box.

In assembling the draft gear, the usual and natural precautions are taken, for example, the open end of the barrel is carefully planed or ground until true and parallel to the bottom face before applying the friction box, and care is taken to see that the spring pockets and seats are clear and true so that the springs will not bind on the sides, nor rest unevenly on their seats. The friction box and barrel are first clamped in position without the springs being in place, and the two diagonally positioned holes for the pins 14 are simultaneously drilled. The friction box is then removed from the barrel, and the springs and center wedge inserted in the barrel, the springs when entirely free being but a small amount, usually less than an inch, larger than when expanded to the amount permitted when in place in the draft gear. The usual method of assembly is departed from in that the metal disks or chocks 30 are placed on the diagonal corners of the center wedge 16 adjacent to the holes for the pins 14 before applying the friction box, thereby spacing the flange of the wedge from the under face of the friction box by the thickness of the disk. The wedges and the friction box with the chocks in place are now forced into position and the springs compressed in the usual manner.

When the parts are thus assembled and compressed, the pins are inserted to hold the friction box permanently to the barrel. The holes for these pins are slightly larger than the size of the pins and the pins are fitted hot and are driven in until they expand well into the cavity between the friction box and the barrel, taking a shape approximately as shown by the dotted line 32, but not extending beyond the face of the barrel. These pins serve a dual function; they not only permanently secure the friction box to the barrel and prevent it being torn off due to the tendency of the box to follow the side blocks, under certain circumstances, in the outward travel of the side blocks, but they serve as members to take up the entire force of the spring prior to the assembly of the draft gear in the car.

As shown most clearly in Figure 1, there is clearance between the end of the face of the friction box 12 and the flange of the center wedge 16, this provision of clearance permitting the center wedge 16 to move outward from time to time to take up the slack caused by the gradual wear of the friction faces, the amount of clearance being such as to permit for such wear as will take place over a considerable period of time. This clearance also relieves the friction box of the duty of taking thrust from the springs through the center wedge after installation of the gear.

By the use of the chocks, the springs are held compressed within the barrel, the springs pressing forwardly against the friction box and rearwardly against the base of the barrel with the center wedge spaced away from the friction box by the chocks, thus permitting the two side wedges and the follower to be nearer to the base of the barrel than would be possible without the use of the chocks. The gear, therefore, is slightly shorter than the space into which it is to be applied, rendering it simple and easy to install the gear in its pocket. In addition to the shortening of the gear, the chocks 30 have a very important further function in that they permit the use of a spring having a higher initial compression. The retaining bolts 18 do not take severe tension, and are used primarily to prevent loss of the side wedges and the follower before installation, as the force of the springs is resisted by the sides of the pocket after installation and by the friction box prior to installation. The nut 31 on the retainer bolt 18 may be applied while the parts are in the press or it may be applied later since it is only necessary to drop the two side wedges in place and then assemble the follower without any pressure whatsoever.

After the pins 14 have been fitted, the entire force of the spring is transmitted from the base of the barrel through the chock 30 and resisted by the pins 14, but as soon as the gear is assembled, the force of the spring is taken entirely by the pocket, being transmitted through the center wedge to the two side wedges and the follower, so that after installation, the only tendency to shear the pins 14 is that caused by the friction between the side wedges and the friction box. After the gear has been installed in its pocket, it is loose until the first partial closing of the gear, whereupon the disks or chocks 30 fall away, thereby permitting the gear then to occupy the full length of the standard draft gear pocket.

What I claim is:

1. In a draft gear of the type having a barrel, a wedge movable relatively to the barrel, a spring between the wedge and barrel, and means adapted to engage said wedge to compress said spring, means held in contact with said wedge by said spring and free to fall away when said wedge moves inwardly into the barrel to compress said spring.

2. In a draft gear, a barrel having a friction box, a spring within said barrel, a center wedge, a plurality of side wedges frictionally engaging said box and said center wedge, a retaining bolt, and means within said gear for temporarily limiting outward travel of said spring.

3. A draft gear of the type comprising a spring barrel and friction box, securing means for permanently holding said friction box to said barrel, a center wedge, side wedges slidably engaging said friction box and said central wedge, means for yieldingly restisting inward movement of said center wedge, a follower, a retainer bolt slidably held in said barrel and in said follower, and a plurality of chocks temporarily inserted between the end face of said friction box and said center wedge, there being one chock adjacent each of said securing means, said chocks being free to fall away with the first closing of the gear after installation in its pocket, whereby said gear may then occupy the full length of the pocket.

4. A draft gear of the type employing a barrel, a spring within the barrel, wedge means to compress the spring, means for permanently limiting the expansion of said spring, and temporary chocks for still further limiting the expansion of the spring to facilitate the installation of the gear in its pocket.

5. In a draft gear of the type having a barrel, a spring within the barrel, a central wedge, a plurality of relatively movable wedges engaging said central wedge to compress said spring, a retaining rod, means for limiting the expansion of said spring, and temporary means within the gear for still further limiting the expansion of the spring, whereby the gear is held somewhat shorter than the space in which it is to be applied.

6. The method of assembling a draft gear including a spring, a barrel, a center wedge, and a friction box, which consists in placing the spring within the barrel, placing the center wedge on the spring, placing a chock on the center wedge, placing the friction box against said chock, applying pressure to cause said friction box to move toward said barrel and compress said spring, securing the friction box to the barrel, and then releasing said pressure.

7. The method of assembling a draft gear of the type employing a spring barrel, a friction box, a spring, a plurality of wedges, one of which is directly operated by the spring, and a follower, which consists in assembling the parts in usual manner except that a pair of temporary chocks are inserted between the spring engaging wedge and the friction box to increase the longitudinal distance between the follower and the wedge directly operated by the spring, applying pressure to compress the spring, securing the parts in such position, placing the gear with the chocks still in position in its pocket, and finally operating the gear under service condition to rid it of said temporary chocks so that the gear may expand to fill its pocket.

In testimony whereof I affix my signature.

ERNEST G. GOODWIN.